Figure 1:
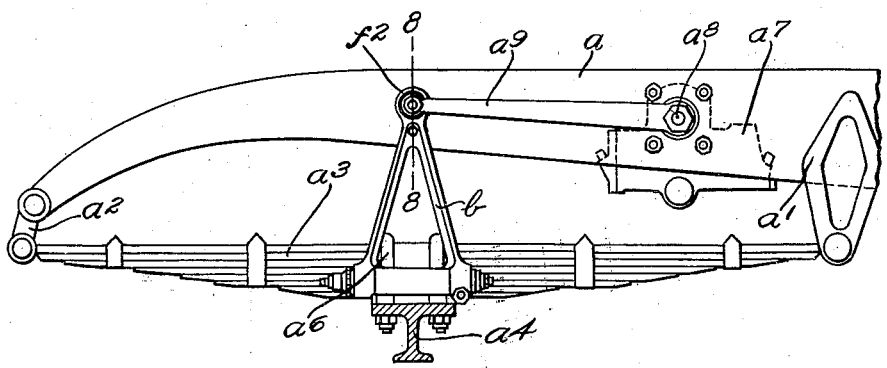

Jan. 14, 1930.  F. H. ROYCE  1,743,399
SUSPENSION OF ROAD VEHICLES
Filed May 28, 1927  2 Sheets-Sheet 1

Inventor
Frederick Henry Royce
By Mason Fenwick & Lawrence
Attorneys

Jan. 14, 1930.  F. H. ROYCE  1,743,399
SUSPENSION OF ROAD VEHICLES
Filed May 28, 1927   2 Sheets-Sheet 2

Inventor
Frederick Henry Royce

By Mason Fenwick & Lawrence,
Attorneys

Patented Jan. 14, 1930

1,743,399

UNITED STATES PATENT OFFICE

FREDERICK HENRY ROYCE, OF ELMSTEAD, WEST WITTERING, NEAR CHICHESTER, ENGLAND, ASSIGNOR TO ROLLS-ROYCE LIMITED, OF DERBY, ENGLAND

SUSPENSION OF ROAD VEHICLES

Application filed May 28, 1927, Serial No. 194,960, and in Great Britain June 4, 1926.

This invention has reference to the suspension of mechanically driven road vehicles.

In mechanically driven road vehicles having brakes on the front wheels, it is necessary or desirable to arrange some device to prevent a rotary movement of the front axle when the brakes are applied, which movement interferes with the steering; and amongst devices for this purpose are some which comprise (amongst other factors) a radius rod hinged at its rear end to the frame and at its front end to the axle and at a suitable point thereon, and one proposed by me which comprises such a radius rod in combination with a semi-elliptical spring pivoted at its rear end.

According to this invention in a vehicle of the kind referred to having a radius rod such as aforesaid and also having a shock absorber provided, the shock absorber is fixed to the chassis either in front of, or to the rear of, the front axle, an elongated member (which may be part of a semi-elliptical spring adopted for suspension) is at one end pivotally fixed to the chassis on the same side of the axle as the shock absorber, and is fixed to the said axle, a vertical bracket in approximately the same vertical plane as the said member is fixed to, and for fore and aft movement rigid with, but capable of rotating laterally in a plane normal to the said axle, and a rod acting on both the radius rod and the lever actuating the shock absorber is at one end operatively connected to the shock absorber and at the other end hinged to the end of the bracket.

An example of my invention is constructed as follows:—

A semi-elliptical laminated spring, the the main leaf of which is at its rear end pivotally hinged on a fixed bracket, depending from the frame, and at its front end secured to the dumb iron by means of a shackle, is centrally secured to the axle; a bracket in the form of an upturned V in a vertical longitudinal plane relative to the vehicle, is secured at its base to the axle by a form of hinge allowing it to swing, relatively to the axle, in the vertical plane containing the axle, a radius rod is hinged at its front end to the bracket at or near the apex thereof by a ball and socket joint, and at its rear end is secured to a horizontal rocking shaft of a shock absorber (which is rigidly secured to the frame) in which the angular movement of this rocking shaft is restrained by frictional or hydraulic means.

An example of this invention is illustrated in the accompanying drawings.

Figure 2:
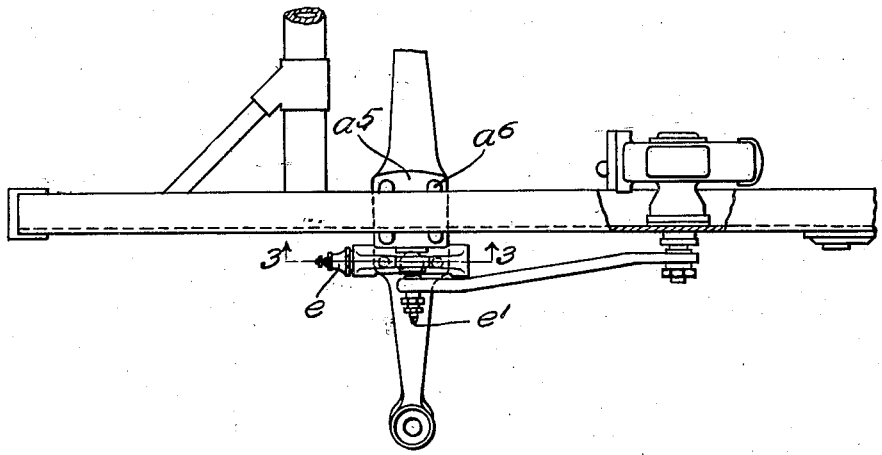
Figure 7:
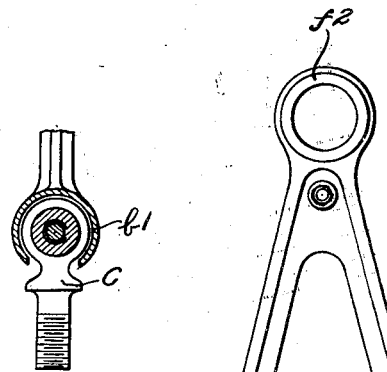
Figures 3, 4:
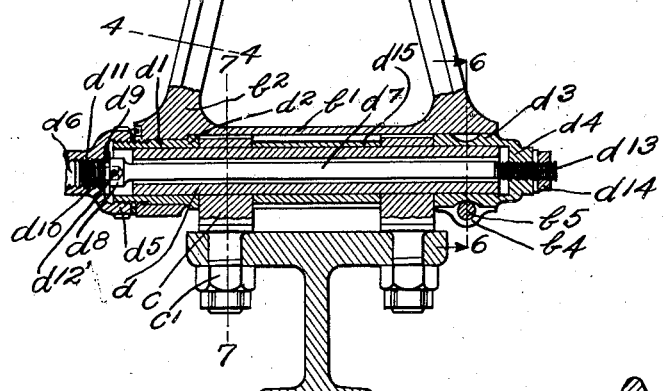
Figure 6:
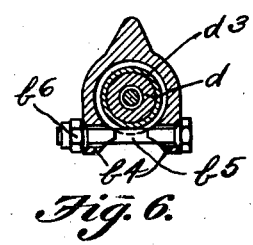
Figure 5:
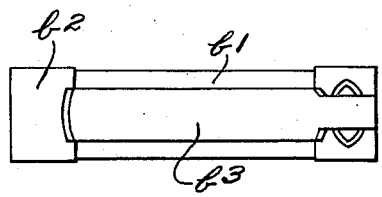

Fig. 1 is a side elevation of the device, the end of the axle which projects towards the observer being cut off. Fig. 2 is a plan view of Fig. 1 with a small part in section. Fig. 3 is a part sectional elevation to an enlarged scale of part of Figs. 1 and 2, on the line 3—3 of Fig. 2. Fig. 4 is a part-section on line 4—4 of Fig. 3. Fig. 5 is an inverted plan view of the upturned V bracket, all its loose parts being omitted. Fig. 6 is a section on line 6—6 of Fig. 3. Fig. 7 a section on line 7—7 of Fig. 3, and Fig. 8 a section on line 8—8 of Fig. 1.

It will, of course, be understood that the arrangement shown in Fig. 2 is duplicated on the other side of the chassis not shown. $a$ is the side member of the chassis frame, $a^1$ a bracket bolted to the side member, $a^3$ a semi-elliptical spring pivoted at the rear end to the bracket and secured at the front end by a shackle $a^2$ to the dumb iron, $a^4$ is the axle, $a^5$ is a saddle formed on the axle to which the spring is affixed by U bolts $a^6$. The saddles are extended outwards laterally for the purposes hereinafter appearing. $a^7$ is a hydraulic shock absorber actuated by the rocking of the shaft $a^8$ to which the rod or lever $a^9$ is secured. $b$ is a bracket in shape of an inverted V having an eye hole at the apex hereinafter described, to which the rod or lever $a^9$ is jointed, the side members being T shaped in cross section as shown in Fig. 4, and having a cylindrical base of two internal diameters, the larger $b^1$ and smaller $b^2$ and having a slot $b^3$ (see Fig. 5) in the under part extending the whole length of the part $b^1$ and having at the outer end of the part $b^1$ two lugs $b^4$ (see Fig. 6) formed thereon through which are registering holes to receive bolt $b^5$ which when the parts are assembled is secured by nut $b^6$.

The bracket is secured to the axle by the means now to be described. The saddle piece $a^5$ which forms the bed for the spring and takes the U bolts is laterally extended and holes are bored through the extension.

$c$ (see Figs. 3 and 7) are bolts with their heads in the form of eyes, inserted through the holes in the saddle piece secured by castellated nuts $c^1$, the eyes being enveloped by the part $b^1$ of the cylindrical base of the bracket $b$. $d$ is a hollow pin passing through the eyes of the bolts $c$, $d^1$ is a bearing bush formed with a shoulder $d^2$ butting against the shoulder formed by the break of the internal diameters of the parts $b^1$ and $b^2$ of the cylindrical base, pressed into and tightly fitting the interior of part $b^2$ and externally threaded at its outer end, $d^3$ is a bearing bush having a restricted end $d^4$ which is internally threaded, clamped to the part $b^1$ of the cylindrical base by means of bolts $b^5$, $d^5$ is a cap screwed onto the bearing bush $d^1$ having a serrated periphery and a tapped hole $d^6$, $d^7$ is a rod passing down the hollow pin $d$ with a clearance therefrom formed with an enlarged end $d^8$, a flange $d^9$, a threaded extended part $d^{10}$, a drilled hole $d^{11}$, and lateral holes $d^{12}$ into the said drill hole $d^{11}$, and a threaded part $d^{13}$ at the other end which engages the thread in the part $d^4$ of the bearing bush $d^3$ and is secured by a lock nut $d^{14}$, $d^{15}$ is a distance sleeve to distribute between the eyes any thrust which may arise parallel with the axis of the pin $d$. The construction is assembled as follows:—The two eye-bolts $c$ with the hollow pin $d$ and distance sleeve $d^{15}$ are secured to the axle, the bearing bush $d^2$ is inserted in the cylindrical base, the rod $d^7$ is screwed into the cap $d^5$, and the cap screwed onto the bearing bush $d^1$, the cylindrical base is then passed over the eye-bolts, the necks of such bolts passing down the slot $b^3$, and the rod $d^7$ passing down the centre of the hollow pin $d$, the bearing bush $d^3$ is then placed in position and screwed on to the rod $d^7$, the nut $d^{14}$ is then screwed up and finally the bearing bush $d$ is clamped by means of the bolt $b^5$ and nut $b^6$. $e$ is a lubricator screwed into the cap $d^5$. The lubrication is effected by oil passing from the lubricator $e$ down the hole $d^{11}$ through the lateral holes $d^{12}$, thence to the bearing surface of bush $d^1$, and down the clearance between the hollow pin $d$ and the rod $d^1$ thence to the surface of bearing bush $d^3$.

Figure 8:
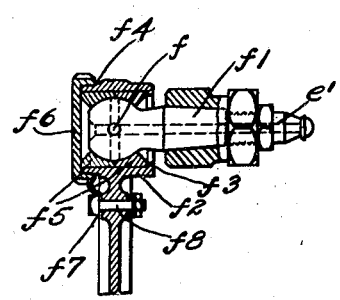

Referring to Fig. 8 $f$ is the ball at the end of the shank $f^1$ which is secured to lever $a^9$. At the apex of the bracket $b$ is an eye $f^2$ having an inwardly projecting flange $f^3$ and a part $f^4$ externally threaded, $f^5$ are two annular bearing pieces having part-spherical faces corresponding to the ball, $f^6$ is a cap internally threaded to engage the threads on the eye $f^2$ and with peripheral serrations for screwing and locking purposes, and $f^7$ is a locking plate secured by a bolt $f^8$. $e^1$ is a lubricator.

The shaft $a^8$ is so related to the pivot on bracket $a^1$ on which the spring is hinged that, on all normal movements of the axle relative to the chassis frame, the axle is not appreciably displaced in a rotational sense.

It will be observed that in the arrangement described the lever operating the shock absorber and the radius rod are one and the same member.

It will also be observed that notwithstanding that the radius rod can by reason of its attachment to the rocking shaft of the shock absorber only move in a vertical plane, nevertheless by reason of the ball and socket joint between the rod and the apex of the bracket, and also of the hinge constituted by the cylindrical base of the bracket $b$ and the associated members, changes of inclination of the axle in a vertical plane are accommodated, without straining any of the members or the joints.

What I claim is:—

1. Apparatus for the suspension of the body on the front axle of a mechanically driven road vehicle comprising a shock absorber adapted to be actuated by a lever, secured to the chassis at a suitable point remote from the vertical plane containing the axle, a pivot lying in a transverse direction supported on the chassis frame on the same side of the axle as the shock absorber, a semi-elliptical spring hinged at one end on the said pivot and secured at or about its centre to the said axle, an upstanding bracket secured to the axle and rigid therewith against fore and aft movement but capable of rocking in a transverse plane, and a rod acting as a lever and a radius rod, at one end operably connected to the shock absorber, and at the other end connected by a ball and socket joint with the free end of the bracket.

2. Apparatus for the suspension of the body on the front axle of a mechanically driven road vehicle comprising a shock absorber adapted to be actuated by a lever, secured to the chassis at a suitable point remote from the vertical plane containing the axle, a pivot lying in a transverse direction supported on the chassis frame on the same side of the axle as the shock absorber, a semi-elliptical spring hinged at one end to the said pivot and secured at or about its centre to the said axle, an upstanding bracket secured to the said axle and rigid therewith against fore and aft movement, but capable of rocking in a transverse plane, and a rod, acting as a lever and radius rod, at one end operably connected to the shock absorber and at the other end connected by a ball and socket joint to the free end of the bracket, the shaft of the shock absorber to which the rod is attached and the pivot to which the spring is attached being so related, that the axle in all its normal movements is not appreciably displaced in a rotational sense.

3. Apparatus for the suspension of the body on the front axle of a mechanically driven road vehicle comprising a shock absorber adapted to be actuated by a lever, secured to the chassis frame at a suitable point remote from the vertical plane containing the axle, a pivot lying in a transverse direction supported on the chassis frame on the same side of the axle as the shock absorber, a semi-elliptical spring hinged at one end on the said pivot and secured at or about its centre to the said axle, an upstanding bracket in shape of an inverted V, a cylindrical member integral with and forming the base of such bracket, a trunnion within such cylindrical member fixed to the axle in a fore and aft direction constituting an axle about which the bracket rocks, means for locating the cylindrical member and trunnion relatively, an eye at the apex of and integral with the said bracket adapted to house a ball and socket joint, and a rod, constituting a lever and radius rod, at one end operably connected to the shock absorber and at the other end connected by a ball and socket joint to the free end of the bracket.

4. Apparatus for the suspension of the body on the front axle of a mechanically driven road vehicle comprising a shock absorber adapted to be actuated by a lever, and secured to the chassis at a suitable point remote from the vertical plane containing the axle, a pivot lying in a transverse direction supported on the chassis frame on the same side of the axle as the shock absorber, a semi-elliptical spring hinged at one end to the said pivot and secured at or near its centre to the said axle, an upstanding bracket in shape of an inverted V, a cylindrical member integral with and forming the base of such bracket, a trunnion within such cylindrical member fixed to the axle in a fore and aft direction, constituting an axle about which the bracket rocks, means for locating the cylindrical member and trunnion relatively, an eye at the apex of and integral with the said bracket adapted to house a ball and socket joint, a rod, constituting a lever and radius rod, at one end operably connected by a ball and socket joint to the free end of the bracket, the shaft of the shock absorber to which the rod is attached and the pivot to which the spring is attached being so related, that the axle in all its normal movements is not appreciably displaced in a rotational sense.

In witness whereof I have signed this specification.

FREDERICK HENRY ROYCE.